S. De VEAUX & J. ROSSER.
CHECK-ROWER AND CORN-DRILL.
No. 191,003. Patented May 22, 1877.
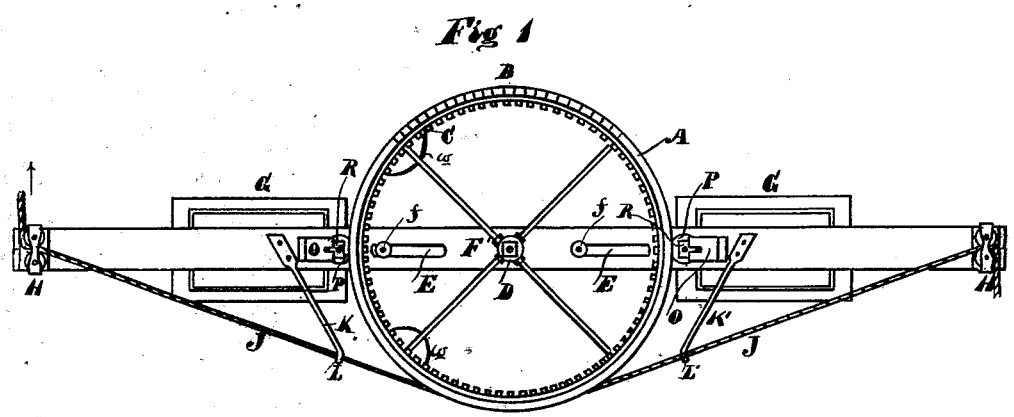
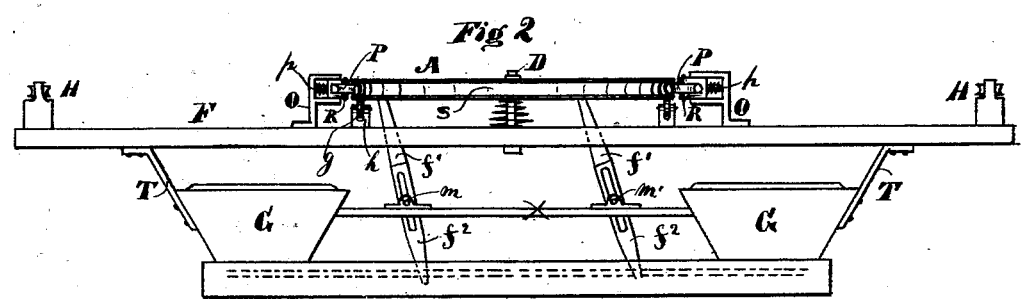
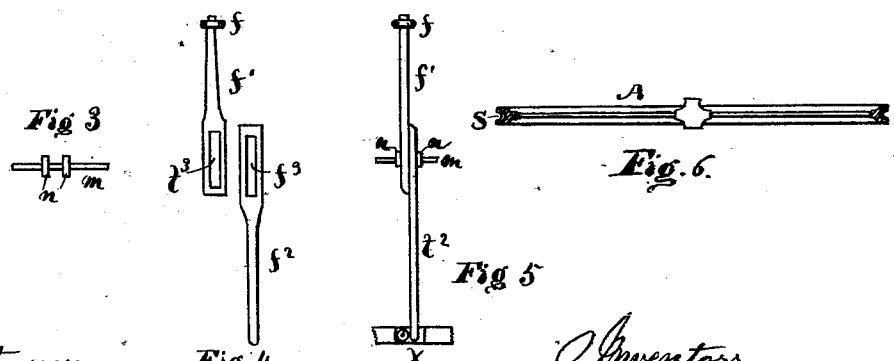

UNITED STATES PATENT OFFICE.

SAMUEL DE VEAUX AND JOHN ROSSER, OF LA FAYETTE, INDIANA; SAID DE VEAUX ASSIGNOR TO SAID ROSSER.

IMPROVEMENT IN CHECK-ROWER AND CORN-DRILL.

Specification forming part of Letters Patent No. 191,003, dated May 22, 1877; application filed January 20, 1877.

*To all whom it may concern:*

Be it known that we, SAMUEL DE VEAUX and JOHN ROSSER, of La Fayette, Tippecanoe county, State of Indiana, have invented a new and useful Improvement in Check-Rowers and Corn-Drills, of which the following is a description, reference being had to the accompanying drawings.

This invention relates to certain improvements in the construction, arrangement, and operation of a check-rower and corn-drill, and is designed to be an improvement upon Patent No. 184,231, which was granted to Samuel De Veaux November 14, 1876.

Our present invention is confined to certain improvements to be used in connection with the devices described in the said patent, and has for its object a check-rower or grain-drill so constructed as to prevent the slipping of the rope or wire (that extends across the field) on the sheave, and to use a plain rope or wire, with no knots, buttons, or catches to operate the slide-levers, and to obtain a regular drop of grain at required distances at any part of the field.

Previous to our invention there has been great difficulty in check-rowers to overcome the slipping of the rope (that is stretched across the field) on the sheave, and to overcome the irregularity of feed; and we are aware of machines which use ropes with knots, or buttons, or catches arranged at regular intervals, so as to operate the feed-bar levers. To such devices we make no claim.

In the drawings, Figure 1 represents a plan view of our improved check-rower and seed-drill. Fig. 2 is a side elevation of the same. Fig. 3 represents the adjustable pivot-bolt of the levers. Figs. 4 and 5 represent several views of the adjustable levers. Fig. 6 represents a sectional view of the sheave-wheel.

F represents a bar, that extends across any corn planter or drill, and is attached to the seed-boxes G G by the brackets T T in such a manner as to allow the center of the sheave A to be in line with the sliding feed-bar that is under the seed-boxes G G. The sheave A is mounted on the stud or spindle D, may be provided with a cog-rack, regulator, and eccentrics or cams, in the same manner as in Patent No. 184,231, above referred to, and is further provided with an elastic lining, S, such as rubber, leather, &c., in the groove of the sheave. This lining S prevents the rope or wire J from slipping as the rope is rolled on and off of the sheave, and thus overcomes one of the greatest difficulties of a check-rower or drill, and forms an essential feature of our invention.

At each end of the bar F are attached sets of double sheaves H, between which the rope J is guided on or off of the main sheave A.

The bar F is perforated on each side of the stud D with slots E E, through which the levers $f^1 f^2\ f^1 f^2$ operate, which will hereafter be fully described.

On the bar F, immediately under the rim of the sheave A, are located two rollers, $h\ h$, at opposite sides, journaled in proper bearings, which help to support the sheave A and reduce the friction, and on the bar F outside of the friction-rollers $h$ are located two sheave-rollers, P P, one on each side. These sheave-rollers are journaled in slides R R, that operate in guide-brackets O O, and each slide R is provided with a spring, $p$, which operates between the slides R and inner side of the guide-brackets O in such a manner as to force the sheaves P against the elastic lining S of the sheave A. The rope or wire J encircles the sheave A, and is held in close contact with the elastic lining S by the pressure-sheaves P P, and is thus effectually prevented from slipping.

The rope J is guided onto and off of the sheave A by means of the ring or eye-brackets K K', which are secured on the bar F, and the rope J passes through the eyes L L', as shown in Fig. 1.

The slide-operating levers $f^1 f^2\ f^1 f^2$ are constructed, as shown in Figs. 4 and 5, in two sections. The upper section $f^1$ is provided with a roller, $f$, at the top, that is operated by the cams $w$ that are attached to the sheave A, and the lower end is provided with a slot, $f^3$. The lower section $f^2$ is also provided with a slot, $f^3$, at its upper end, the lower end being left straight, so as to operate against the slide $x$ below, as shown in Fig. 5. The two sections $f^1\ f^2$ are united together, by means of the pivot-bolt $m$, (shown in Fig. 3,) in such a manner as to make the length of the compound levers adjustable, and at the same time to form a pivot, on which the levers vibrate. These features are essentially owing to the variety of lengths that are required of the levers. The pivot-bolt $m$ is provided with two nuts, as a nut and collar, between which the two sections of the levers are secured.

The sheave A is revolved by means of the rope J and movement of the machine, thus causing the rollers $f$ on the top of the compound levers $f^1 f^2$ to come in contact with the cams $w$ on the sheave A. These impart an alternate motion to the levers, causing them to vibrate, and thus operate the usual slide and drop the grain at regular intervals.

The sheave A is divided into quarters, and each quarters is subdivided into inches, as shown at B, Fig. 1, and the rope J is marked, by paint or other means, to indicate regular distances. These marks on the rope J allow the cams $w$ to be adjusted at any part of the field to correct any irregularity of drop by moving the cams until the marked place on the rope corresponds with the proper graduated mark on the sheave A.

What we claim as new, and wish to secure by Letters Patent, is—

1. The combination of the horizontal sheave A of a check-rower, the rope J passing completely round the same, and the grooved sheaves P turning in spring-bearings and revolving in contact with the rope at opposite sides of the sheave A, as set forth.

2. The combination of the sheave A, fulcrum-bolts $m$, and levers, consisting of bars $f^1 f^2$, having coinciding slots receiving the bolts $m$ and clamped thereto, as and for the purpose set forth.

In testimony whereof we have signed our names to this specification in the presence of two subscribing witnesses.

SAMUEL DE VEAUX.
JOHN ROSSER.

Witnesses:
   E. O. FRINK,
   M. MAHLER.